US005270881A

United States Patent [19]

Miyahara

[11] Patent Number: 5,270,881

[45] Date of Patent: Dec. 14, 1993

[54] ROTARY TRANSFORMER WINDING ARRANGEMENT IN A MAGNETIC TAPE CASSETTE APPARATUS HAVING A ROTARY HEAD ASSEMBLY

[75] Inventor: Keisuke Miyahara, Tokorozawa, Japan

[73] Assignee: Teac Corporation, Tokyo, Japan

[21] Appl. No.: 727,482

[22] Filed: Jul. 9, 1991

[30] Foreign Application Priority Data

Jul. 17, 1990 [JP] Japan .............................. 2-75667[U]

[51] Int. Cl.[5] .............................................. G11B 15/14

[52] U.S. Cl. .......................................... 360/64; 360/68

[58] Field of Search ........................ 360/46, 61, 62, 64, 360/67, 68, 108, 124

[56] References Cited

U.S. PATENT DOCUMENTS 4,210,945 7/1980 Lavrentiev et al. ................ 360/108
4,924,329 5/1990 Masuda et al. ........................ 360/64

FOREIGN PATENT DOCUMENTS 191104 10/1984 Japan ..................................... 360/62
113803 5/1988 Japan ..................................... 360/124

*Primary Examiner*—Paul Gensler
*Attorney, Agent, or Firm*—Woodcock, Washburn, Kurtz, Mackiewicz & Norris

[57] ABSTRACT

A magnetic tape cassette apparatus is disclosed which has a pair of electromagnetic data transducers mounted to a rotary drum to make up a rotary head assembly for data transfer with the magnetic tape. For electrically connecting each transducer to a recording amplifier circuit and a reproducing amplifier circuit, a transformer is employed which comprises a rotary winding mounted to the rotary drum, and two fixed windings electromagnetically coupled to the rotary winding. The two fixed windings are connected respectively to the recording amplifier circuit and the reproducing amplifier circuit. In another embodiment the transformer comprises one rotary winding and one center tapped fixed winding. The two sections of the fixed winding, electrically divided by the center tap, are connected respectively to the recording amplifier circuit and to the reproducing amplifier circuit.

24 Claims, 3 Drawing Sheets

HEAD DRIVE
TAPE TRANSPORT
10 12 14 16 16' 18 20 22 24 26 28 30 32 34 34' 36 36' 38 38' 40 40' 42 44 46 48 50 52 54 55 56 58 59 60 63 66 68 70 72 74 76 78 80 C

HEAD DRIVE
TAPE TRANSPORT
10
12
14
16
16'
18
20
22
24
26
28
30
32
34
34'
36
36'
38
38'
40
40'
42
44
46
48
50
52
54
55
56
58
59
60
63
66
68
70
72
74
76
78
80
C

ROTARY TRANSFORMER WINDING ARRANGEMENT IN A MAGNETIC TAPE CASSETTE APPARATUS HAVING A ROTARY HEAD ASSEMBLY

BACKGROUND OF THE INVENTION

My invention relates to magnetic tape recording and reproducing systems, particularly to those having a rotary electromagnetic head assembly, suitable for the recording and reproduction of video signals on magnetic tape packaged in cassette form. However, I do not wish may invention to be limited to this particular application because the fundamental concepts of my invention are applicable to digital audio tape cassette apparatus and other magnetic tape devices of the kind having a rotary head assembly.

In a typical rotary head video tape cassette apparatus, as is well known, a pair of electromagnetic data transducers or heads are mounted to a rotary drum in diametrically opposite positions thereof to make up a rotary head assembly. The heads are electrically connected to a recording circuit and a reproducing circuit via a "rotary" transformer. As heretofore constructed, the rotary transformer had a "rotary" winding mounted to the rotary drum and electrically connected to each head, and a "fixed" winding mounted to a stationary part of the apparatus and electromagnetically coupled to the rotary winding.

Conventionally, the single fixed winding of the transformer was used both for recording and reproduction; that is, the fixed winding had its opposite extremities connected respectively to the recording circuit and to the reproducing circuit. This prior art construction made it necessary to provide a recording switch between one extremity of the fixed winding and the ground, and a reproducing switch between the other extremity of the fixed winding and the ground. Both recording and reproducing switches took the form of semiconductor switches such as transistors. The recording switch was closed for recording, and the reproducing switch was closed for reproduction.

This prior art construction is a source of a problem because the semiconductor switches could not possibly be held completely open. That was because the semiconductor switches when open had some stray capacitances that provided electrical connections between the signal lines and the ground. Moreover, such capacitances tended to resonate with the transformer inductance, with a consequent decrease in the frequency range of the recording or reproducing circuit. Furthermore, the high frequency components of the signals being recorded or reproduced were easy to leak through the stray capacitances. An additional objection concerns noise production by the semiconductor switches. Such noise, amplified by the amplifier in the reproducing circuit, deteriorated the signal to noise ratio of the prior art system.

I know another conventional approach to the problem of how to connect the transducers on the rotary drum to the recording and the reproducing circuit. It employed a second, "fixed" transformer, in addition to the first, "rotary" transformer, which was fixedly mounted on a circuit board. One of the two windings of the fixed transformer was connected to the fixed winding of the rotary transformer, and the other winding of the fixed transformer was connected to the recording and the reproducing circuit. Also, as in the first recited conventional scheme, a recording switch and a reproducing switch were connected between the opposite extremities of the second mentioned winding of the fixed transformer and the ground.

This second known approach is also objectionable because the signal lines between the rotary and the fixed transformer were very easy to pick up noise, again resulting in the deterioration of the signal to noise ratio. Another reason is the use of the additional transformer itself, which required a large installation space and added to the manufacturing cost of the apparatus.

SUMMARY OF THE INVENTION

I have hereby invented how to construct magnetic tape apparatus of the kind having a rotary head assembly, so as to overcome the noted inconveniences which arose from the use of the transformer or transformers of prior art construction.

Briefly, my invention may be summarized as an apparatus having a rotary head assembly for data transfer with magnetic tape, the rotary head assembly having a pair of electromagnetic data transducers mounted to a rotary drum. The improvement according to my invention comprises a rotary transformer having a rotary winding mounted to the rotary drum and electrically connected to each data transducer, and two fixed windings electromagnetically coupled to the rotary winding. The two fixed windings of the rotary transformer are individually connected to a recording circuit and a reproducing circuit.

Alternatively, the rotary transformer may have but one center tapped fixed winding in place of the two fixed windings. In this case, the two sections of the single fixed winding, so divided by the center tap, may be individually connected to a recording circuit and a reproducing circuit.

Thus, according to my invention, the recording circuit and the reproducing circuit are separately connected to the two fixed windings, or to the two sections of the single fixed winding, of a transformer. The apparatus according to my invention can therefore dispense with one or both of the recording and reproducing switches that have been so far required for making common use of a single fixed winding for both recording and reproduction. The results are substantial noise reduction and improvement in high frequency characteristic.

It will also be appreciated that our invention requires but one transformer, compared with two required by the second mentioned prior art approach. The reproducing circuit may therefore be positioned sufficiently close to the rotary head assembly to minimize the lengths of signal lines between the reproducing circuit and the rotary transformer.

The above and other features and advantages of my invention will become more apparent, and the invention itself will best be understood, from a study of the following description and appended claims, with reference had to the attached drawings showing some preferred embodiments of my invention.

DESCRIPTION OF THE PREFERRED EMBODIMENTS

Figure 1:
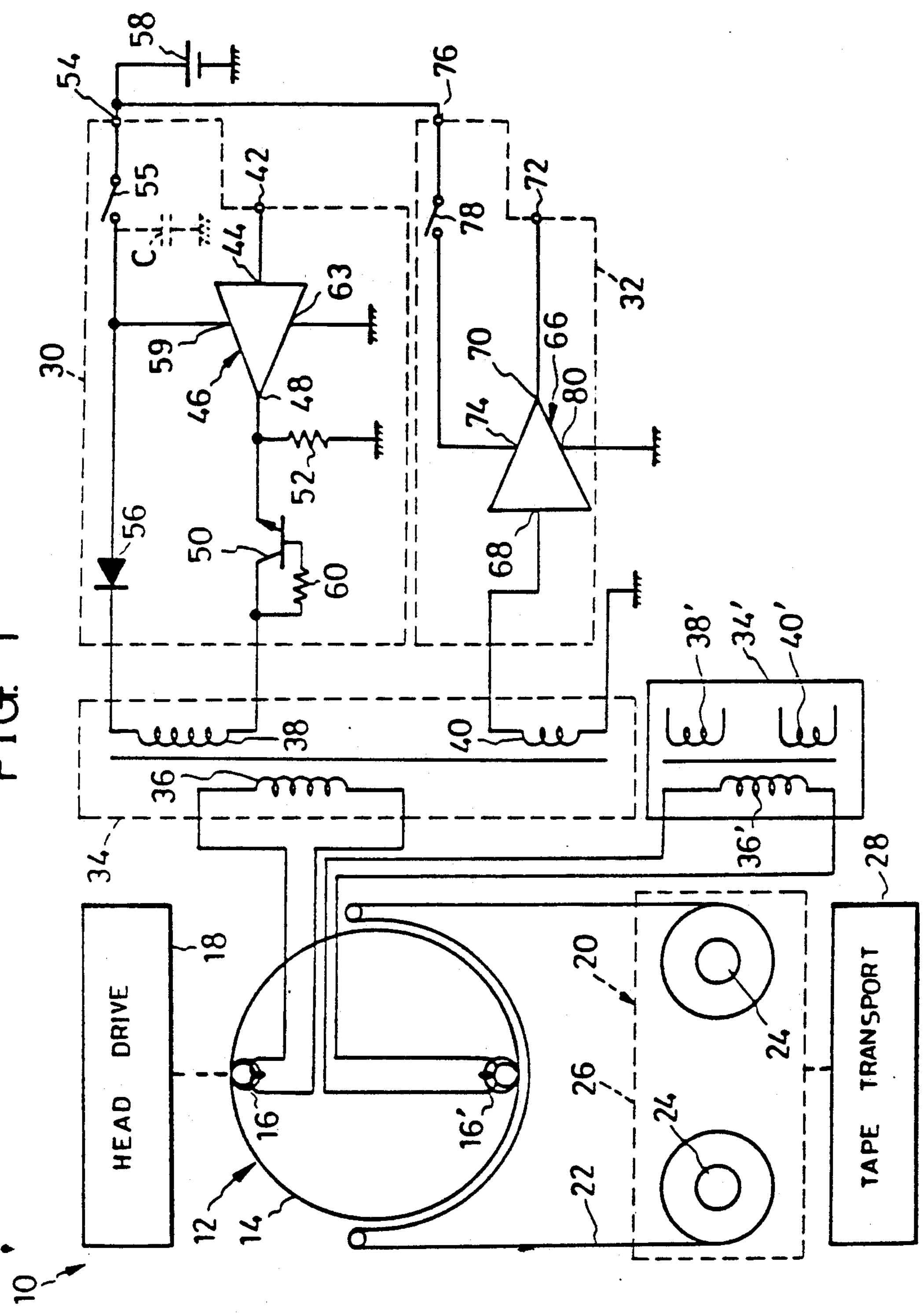
FIG. 1 is a schematic electrical diagram of a video tape cassette apparatus incorporating the novel concepts of my invention.

I will now describe my invention in detail as embodied in the video tape cassette apparatus illustrated diagrammatically in FIG. 1 and generally designated 10. The video tape cassette apparatus 10 includes a rotary head assembly 12 which can be per se of conventional make. Suffice it to say, therefore, that the rotary head assembly 12 comprises a rotary drum 14 and a pair of electromagnetic data transducers or heads 16 and 16′ mounted thereto. A head drive mechanism 18 including an electric drive motor is coupled to the rotary head assembly 12 for imparting rotation thereto.

At 20 is indicated in phantom outline a magnetic video tape cassette replaceably mounted within the apparatus 10. The tape cassette 20 has a length of tape 22 having its opposite ends anchored to a pair of reels or hubs 24 within the cassette housing 26. Drawn from within the cassette housing 26, the tape 22 is shown wrapped aslantly around the rotary head assembly 12 for data transfer with the pair of transducers 16 and 16′.

A tape transport mechanism 28, shown in block form, can also be of conventional design comprising a capstan, pinch roller, capstan motor, and reel motors, which are not shown because of their well known nature. The pair of transducers 16 and 16′ alternately scan the tape 22 along a series of slanting record tracks thereon as the rotary head assembly 12 is driven by the head drive mechanism 18 and the tape 22 is run by the tape transport mechanism 28.

The first transducer 16 is electrically connected to a recording circuit 30 and a reproducing circuit 32 via a first rotary transformer 34. According to a feature of my invention, the first rotary transformer 34 comprises a rotary winding 36, and a first 38 and a second 40 fixed winding which are both electromagnetically coupled to the rotary winding. The rotary winding 36 is mounted to the rotary drum 14 for joint rotation therewith and electrically connected to the first transducer 16. The first fixed winding 38 is connected to the recording circuit 30, and the second fixed winding 40 to the reproducing circuit 32.

A second rotary transformer 34′ is provided which also comprises a rotary winding 36′, and a first 38′ and a second 40′ fixed winding electromagnetically coupled to the rotary winding 36′. Mounted to the rotary drum 14 for joint rotation therewith, the rotary winding 36′ of the second rotary transformer 34′ is electrically connected to the second transducer 16′. It is understood that the two transducers 16 and 16′ share the recording circuit 30 in this embodiment of my invention. Therefore, the first fixed winding 38′ of the second rotary transformer 34′ is connected in parallel with the first fixed winding 38 of the first rotary transformer 34, although this fact is not shown in FIG. 1 for illustrative convenience. It is also understood that the two transducers 16 and 16′ are connected to separate reproducing circuits. Thus, although I have shown only one reproducing circuit 32 for the first transducer 16, it is understood that the second fixed winding 40′ of the second rotary transformer 34′ is connected to the other reproducing circuit similar to the one illustrated.

The recording circuit 30 has a terminal 42 for inputting a signal to be recorded. The input terminal 42 is connected to an input 44 of an amplifier circuit 46 of open collector construction. The amplifier circuit 46 has an output 48 connected to one extremity of the first fixed winding 38 of the first rotary transformer 34 via an npn transistor 50, besides being grounded via a resistor 52. This resistor 52 functions to damp variations in the load impedance of the amplifier circuit 46. A supply terminal 54 is connected to the other extremity of the first fixed winding 38 via a recording switch 55 and a diode 56. A direct current power supply 58 is connected to the supply terminal 54. The supply terminal 54 is also connected to a supply terminal 59 of the amplifier circuit 46 via the recording switch 55. This recording switch is to be closed for the recording of a video signal on the tape cassette 20 by the rotary head assembly 12.

The transistor 50 functions as a switch, becoming conductive for recording. The transistor 50 has a collector connected to the fixed winding 38, an emitter connected to the output 48 of the amplifier circuit 46, and a base connected to its own collector via a resistor 60. The transistor 50 becomes conductive, as does the diode 56, upon closure of the recording switch 55.

Figure 2:
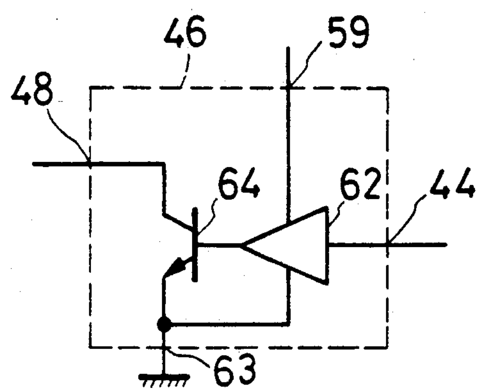
FIG. 2 is a schematic electrical diagram showing in detail the recording amplifier circuit used in the apparatus of FIG. 1.

As illustrated in more detail in FIG. 2, the amplifier circuit 46 is a combination of an amplifier 62 and an npn output transistor 64. The transistor 64 has a base connected to the output of the amplifier 62, an emitter connected to a ground terminal 63, and a collector connected to the circuit output 48. The collector current of the output transistor 64 varies in proportion with the input voltage on the circuit input 44.

With reference back to FIG. 1 the illustrated reproducing circuit 32 for the first transducer 16 comprises an amplifier circuit 66 for amplifying the signal that has been retrieved from the magnetic tape 22 of the tape cassette 20 by the first transducer 16. The input 68 of the amplifier circuit 66 is connected to one extremity of the second fixed winding 40 of the first rotary transformer 34, the other extremity of which winding is grounded. The output 70 of the amplifier circuit 66 is connected to the output terminal 72 of the reproducing circuit 32. Additionally, the amplifier circuit 66 has a supply terminal 74 connected to a supply terminal 76 of the reproducing circuit 32 via a switch 78, and a ground terminal 80 grounded. The supply terminal 76 is connected to the noted d.c. power supply 58. The switch 78 is to be closed for reproduction of the video signal on the tape cassette 20.

As has been stated, the second transducer 16′ of the rotary head assembly 12 is connected to its own reproducing circuit, similar to the illustrated reproducing circuit 32, via the second rotary transformer 34′. Thus the second fixed winding 40′ of the second rotary transformer 34′ is connected between the amplifier circuit, equivalent to the amplifier circuit 66 of the reproducing circuit 32, and the ground.

Figure 3:
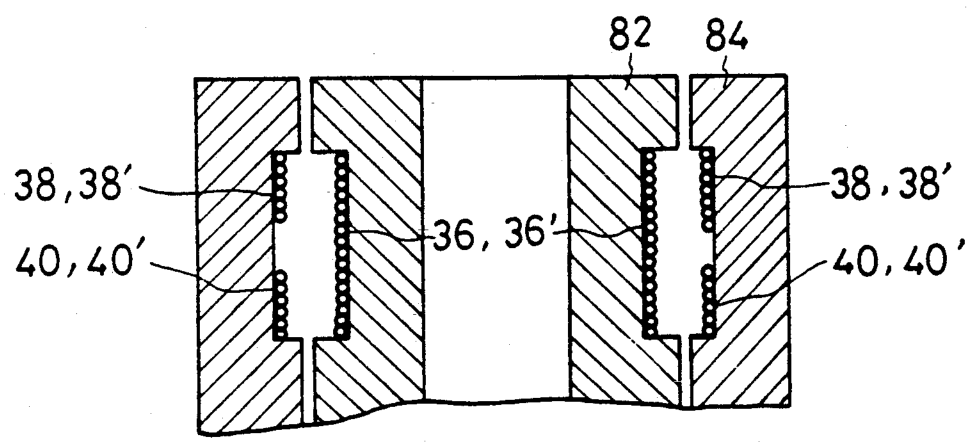
FIG. 3 is an axial section through the rotary transformer used in the apparatus of FIG. 1.

I have illustrated in FIG. 3 the mechanical construction of each of the two rotary transformers 34 and 34′ according to my invention. Each rotary transformer has the rotary winding 36 or 36′ coiled on a rotary magnetic core 82 which rotates with the rotary drum 14, and the two fixed windings 38 and 40, or 38' and 40', coiled on a fixed magnetic core 84 concentrically surrounding the rotary core 82.

It will be seen that the two fixed windings 38 and 40, or 38' and 40', of each transformer 34 or 34' are disposed side by side, with a spacing therebetween, and both opposed to the single rotary winding. Consequently, the inductive and capacitive couplings between the two fixed windings of each transformer are so weak that the recording circuit 30 and the reproducing circuit 32 connected thereto can be sufficiently separated from each other electrically.

OPERATION

For recording, the signal to be recorded will be applied to the input terminal 42 of the recording circuit 30 after the recording switch is closed. A current proportional with the input signal will flow through the path comprising the power supply 58, the switch 55, the diode 56, the first fixed winding 38 of the first rotary transformer 34, the transistor 50, and the transistor 64, FIG. 2, of the recording amplifier circuit 46. The current thus induced in the rotary winding 36 of the first rotary transformer 34 will then flow through the first transducer 16 of the rotary head assembly 12.

Since the first fixed winding 38' of the second rotary transformer 34' is connected in parallel with the first fixed winding 38 of the first rotary transformer 34 as aforesaid, a current proportional with the input signal will also be induced in the rotary winding 36' of the second rotary transformer 34'. This current will then flow through the second transducer 16' of the rotary head assembly 12.

For playback, the signal recovered from the tape cassette 20 by the first transducer 16 will be input to the amplifier circuit 66 of the first reproducing circuit 32 via the rotary winding 36 and second fixed winding 40 of the first transformer 34. Since the switch 78 is closed during playback, the amplifier circuit 66 will amplify the recovered signal for delivery to the output terminal 72. The output from the second transducer 16', on the other hand, will be fed via the rotary winding 36' and second fixed winding 40' of the second transformer 34' to the unshown second reproducing circuit for amplification therein.

Having thus disclosed the tape cassette apparatus of my invention in terms of its first preferred form, I will now set forth the advantages gained by this particular embodiment in the following.

The recording circuit 30 and the reproducing circuit 32 are connected to the two separate fixed windings 38 and 40 of the rotary transformer 34 and thus totally electrically separated from each other. This arrangement makes unnecessary the provision of the semiconductor switches that were employed in the prior art systems in which both recording circuit and reproducing circuit were connected to one and the same winding of a transformer. consequently, the apparatus according to my invention is not to suffer the deterioration of the high frequency characteristic due to the stray capacitances of the semiconductor switches. The absence of a semiconductor switch from the input side of the reproducing amplifier circuit 66 is desirable for the additional reason that the noise generated by the semiconductor switch was conventionally amplified along with the desired signal, with a consequent decrease in signal to noise ratio.

The two fixed windings 38 and 40 of each rotary transformer are disposed side by side, instead of being nested one within the other. The inductive and capacitive couplings of the two fixed windings are therefore sufficiently weak to assure good electrical separation of the recording circuit 30 and reproducing circuit 32 connected thereto.

The signal retrieved from the tape cassette by each transducer is not to leak into the recording circuit 30 because this recording circuit includes the transistor 50 and diode 56 which are nonconductive during reproduction. Should stray capacitance due to a semiconductor switch be present between the supply terminal 54 and the ground, as indicated at C FIG. 1, or should a large voltage regulating capacitor be connected therebetween, the signal being retrieved would leak through the first fixed winding 38 as this winding would be grounded through the stray capacitance or through the voltage regulating capacitor. Also, the signal being retrieved would leak through the first fixed winding 38 toward the recording amplifier circuit 46. However, according to my invention, such signal leakages are prevented by the diode 56 and transistor 50.

Each transducer is connected to at least one transformer which includes the two fixed windings disposed side by side and closely surrounding the rotary winding as in FIG. 3. Therefore, the reproducing amplifier circuit 66 can be disposed sufficiently close to the rotary head assembly 12 to make unnecessary any elongate signal lines that would pick up noise.

SECOND FORM

Figure 4:
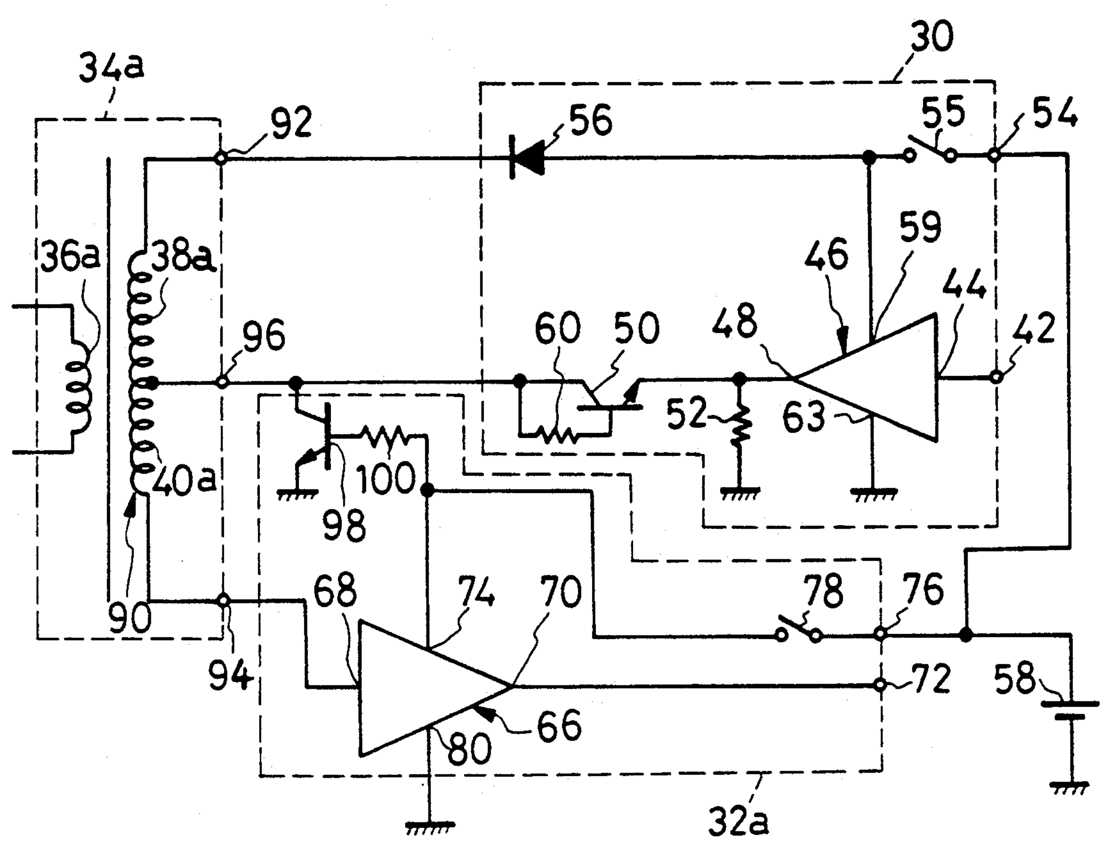
FIG. 4 is a partial, schematic electrical diagram of an alternate video tape cassette apparatus according to my invention.

FIG. 4 shows one of a pair of alternate rotary transformers **34*a* suitable for use with the rotary head assembly 12 of FIG. 1. The illustrated alternate rotary transformer 34*a* has a rotary winding 36*a* and a center tapped fixed winding 90. Mounted to the rotary drum 14 of the FIG. 1 rotary head assembly 12, the rotary winding 36*a* is connected to one of the pair of transducers 16 and 16'**.

The center tapped fixed winding 90, which most characterizes this alternate embodiment, has a pair of terminals 92 and 94 connected to its opposite extremities, and a center tap 96 connected to its electrical midpoint. A first section **38*a* of the fixed winding 90, between the first terminal 92 and the center tap 96, corresponds to the first fixed winding 38 of the FIG. 1 transformer 34. A second section 40*a* of the fixed winding 90, between the second terminal 94 and the center tap 96, corresponds to the second fixed winding 40 of the FIG. 1 transformer 34**.

Thus, as in the FIG. 1 embodiment, the first section **38*a* of the fixed winding 90 is connected to the recording circuit 30 of the same construction as the FIG. 1 recording circuit 30. I have therefore identified the various components part of this recording circuit by the same reference numerals as used to denote their corresponding parts in FIG. 1**.

The second section **40*a* of the fixed winding 90 is connected to a reproducing circuit 32*a* which is similar to the FIG. 1 reproducing circuit 32 except for a switching transistor 98 connected between the center tap 96 of the fixed winding 90 and the ground. Having its base connected to the supply terminal 76 via a resistor 100 and the switch 78, the switching transistor 98 is to conduct during reproduction for connecting the second winding section 40*a* to the reproducing amplifier circuit 66. The other parts of the reproducing circuit 32*a* are identified in FIG. 4** by the same reference numerals as used to denote their corresponding parts in FIG. 1.

This alternate embodiment is analogous in the other details of construction with the FIG. 1 embodiment.

OPERATION OF SECOND FORM

The transistor 98 of the reproducing circuit 32a is nonconductive during recording. Therefore, the recording circuit 30 operates in exactly the same way as in FIG. 1.

During reproduction, on the other hand, the transistor 98 becomes conductive with the result that the center tap 96 of the fixed winding 90 becomes grounded. Thus, with the second section 40a of the fixed winding 90 connected to the reproducing amplifier circuit 66, the data retrieved from the tape cassette 20, FIG. 2, can be amplified for delivery to the output terminal 72. Since the transistor 98 is conductive during reproduction, it will give rise to no stray capacitance. Accordingly, this alternate embodiment gains the same advantages as that of FIGS. 1–3.

THIRD FORM

Figure 5:
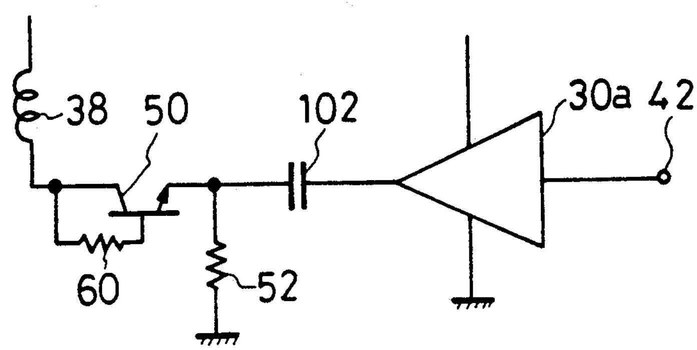
FIG. 5 is a partial, schematic electrical diagram of a slight modification of the recording circuit in the apparatus of both FIGS. 1 and 4.

The open collector amplifier 46 used in the recording circuit 30 in both FIGS. 1 and 4 may be replaced by a usual recording amplifier shown at 30a in FIG. 5. However, in this case, a coupling capacitor 102 may be connected on the output side of the recording amplifier 30a.

Notwithstanding the foregoing detailed disclosure, I do not wish my invention to be limited by the exact details of the illustrated embodiments. A variety of modifications and alterations of my invention will suggest themselves to one skilled in the art. For example, the transistor 50 of the recording circuit 30 might be replaced by a diode, and the diode 56 by a transistor. It is also understood that my invention could be embodied in data transfer systems employing a rotary head assembly. My invention should therefore be construed broadly and in a manner consistent with the fair meaning or proper scope of the appended claims.

What I claim is:

1. An apparatus having a rotary head assembly for data transfer with magnetic tape, the rotary head assembly having a pair of electromagnetic data transducers mounted on a rotary drum, wherein the improvement comprises:

(a) a rotary transformer having a rotary winding which is mounted on the rotary drum and connected to each data transducer, and a first and a second fixed winding which is electromagnetically coupled to the rotary winding;

(b) a recording circuit having:

(1) an input terminal for inputting a signal to be recorded;

(2) a direct current power supply having a first terminal which is connected to one extremity of the fixed winding of the rotary transformer and a second terminal;

(3) an amplifier having an input which is connected to the input terminal and an output; and (4) an output transistor having a base which is connected to the output of the amplifier, an emitter which is connected to the second terminal of the power supply, and a collector which is connected to other extremity of the first fixed winding of the rotary transformer; and (c) a reproducing circuit connected to the second fixed winding of the rotary transformer.

2. The apparatus of claim 1 wherein the first and the second fixed winding of the rotary transformer are disposed side by side.

3. The apparatus of claim 1 wherein the rotary transformer further comprises:

(a) a rotary magnetic core capable of joint rotation with the rotary drum of the rotary head assembly, the rotary winding of the rotary transformer being coiled on the rotary magnetic core; and (b) a fixed magnetic core concentrically surrounding the rotary core, the first and the second fixed winding of the rotary transformer being coiled on the fixed magnetic core in side by side arrangement and both opposed to the rotary winding on the rotary magnetic core.

4. The apparatus of claim 1 wherein the recording circuit further comprises a first switching element connected between the first terminal and said one extremity of the first fixed winding of the rotary transformer.

5. The apparatus of claim 4 wherein the switching element is a diode.

6. The apparatus of claim 1 wherein the recording circuit further comprises a second switching element connected between the collector of the output transistor and said other extremity of the first fixed winding of the rotary transformer.

7. The apparatus of claim 6 wherein the second switching element is a transistor having a collector connected to said other extremity of the first fixed winding of the rotary transformer, an emitter connected to the output transistor, and a base connected to the collector.

8. The apparatus of claim 1 wherein the recording circuit further comprises:

(a) a first switching element connected between the first terminal and said one extremity of the first fixed winding of the rotary transformer; and (b) a second switching element connected between the output transistor and said other extremity of the first fixed winding of the rotary transformer.

9. The apparatus of claim 8 wherein the first switching element is a diode, and wherein the second switching element is a transistor having a collector connected to said other extremity of the first fixed winding of the rotary transformer, an emitter connected to the output transistor, and a base connected to the collector.

10. The apparatus of claim 1 wherein the recording circuit further comprises a resistor connected between the collector of the output transistor and the second terminal of the power supply.

11. The apparatus of claim 10 wherein the recording circuit further comprises a capacitor connected between the output transistor and the resistor.

12. The apparatus of claim 1 wherein the recording circuit further comprises a recording switch connected between the first terminal and said one extremity of the first fixed winding of the rotary transformer, the recording switch being closed during recording on the magnetic tape.

13. The apparatus of claim 1 wherein the reproducing circuit comprises:

(a) a reproducing amplifier connected to the second fixed winding of the rotary transformer;

(b) a supply terminal; and (c) a reproducing switch connected between the supply terminal and a supply input of the reproducing amplifier, the reproducing switch being closed during reproduction.

14. An apparatus having a rotary head assembly for data transfer with magnetic tape, the rotary head assembly having a pair of electromagnetic data transducers mounted on a rotary drum, wherein the improvement comprises:

(a) a rotary transformer having a rotary winding which is mounted on the rotary drum and connected to each data transducer, and a fixed winding which is electromagnetically coupled to the rotary winding, the fixed winding having a center tap and being thereby electrically divided into a first and a second section;

(b) a recording circuit having:

(1) an input terminal for inputting a signal to be recorded;

(2) a direct current power supply having a first terminal which is connected to one extremity of the fixed winding of the rotary transformer and a second terminal;

(3) an amplifier having an input which is connected to the input terminal of the recording circuit and an output; and (4) an output transistor having a base which is connected to an output of the amplifier, an emitter which is connected to the second terminal of the power supply, and a collector which is connected to the center tap of the fixed winding of the transformer; and (c) a reproducing circuit connected to the second section of the fixed winding of the rotary transformer.

15. The apparatus of claim 14 wherein the recording circuit further comprises a first switching element connected between the first terminal and said one extremity of the fixed winding of the rotary transformer.

16. The apparatus of claim 15 wherein the first switching element is a diode.

17. The apparatus of claim 14 wherein the recording circuit further comprises a second switching element connected between the collector of the output transistor and the center tap of the fixed winding of the rotary transformer.

18. The apparatus of claim 17 wherein the second switching element is a transistor having a collector connected to the center tap of the fixed winding of the rotary transformer, an emitter connected to the output transistor, and a base connected to the collector.

19. The apparatus of claim 14 wherein the recording circuit further comprises:

(a) a first switching element connected between the first terminal and said one extremity of the fixed winding of the rotary transformer; and (b) a second switching element connected between the output transistor and the center tap of the fixed winding of the rotary transformer.

20. The apparatus of claim 19 wherein the first switching element is a diode, and wherein the second switching element is a transistor having a collector connected to the center tap of the fixed winding of the rotary transformer, an emitter connected to the output transistor, and a base connected to the collector.

21. The apparatus of claim 14 wherein the recording circuit further comprises a resistor connected between the collector of the output transistor and the second terminal of the power supply.

22. The apparatus of claim 21 wherein the recording circuit further comprises a capacitor connected between the output transistor circuit and the resistor.

23. The apparatus of claim 14 wherein the recording circuit further comprises a recording switch connected between the first terminal and said one extremity of the fixed winding of the rotary transformer, the recording switch being closed during recording on the magnetic tape.

24. The apparatus of claim 14 wherein the reproducing circuit comprises:

(a) a reproducing amplifier connected to the second section of the fixed winding of the rotary transformer;

(b) a switching element connected between the center tap of the fixed winding of the rotary transformer and ground, the switching element having a control input;

(c) a supply terminal; and (d) a reproducing switch connected between the supply terminal and a supply input of the reproducing amplifier, and between the supply terminal and the control input of the switching element, the reproducing switch being closed during reproduction.

* * * * *